(12) United States Patent
Carter

(10) Patent No.: US 10,598,296 B2
(45) Date of Patent: Mar. 24, 2020

(54) VALVE WITH INTERCHANGEABLE OUTLET CONNECTIONS FOR HIGH PURITY GASES

(71) Applicant: NorAm Valves LLC, Roseville, CA (US)

(72) Inventor: Stephen A. Carter, Calgary (CA)

(73) Assignee: NorAm Valves LLC, Roseville, CA (US)

(*) Notice: Subject to any disclaimer, the term of this patent is extended or adjusted under 35 U.S.C. 154(b) by 32 days.

(21) Appl. No.: 16/054,573

(22) Filed: Aug. 3, 2018

(65) Prior Publication Data

US 2019/0040968 A1 Feb. 7, 2019

Related U.S. Application Data

(60) Provisional application No. 62/540,812, filed on Aug. 3, 2017.

(51) Int. Cl.

| | |
|---|---|
| *F16K 27/02* | (2006.01) |
| *F16K 1/02* | (2006.01) |
| *F16L 19/04* | (2006.01) |
| *F17C 13/04* | (2006.01) |
| *F16K 1/30* | (2006.01) |
| *F16K 41/10* | (2006.01) |
| *F16K 31/50* | (2006.01) |
| *F16K 41/02* | (2006.01) |

(52) U.S. Cl.
CPC ........... *F16K 27/02* (2013.01); *F16K 1/02* (2013.01); *F16K 1/305* (2013.01); *F16L 19/048* (2013.01); *F17C 13/04* (2013.01); *F16K 31/50* (2013.01); *F16K 41/023* (2013.01); *F16K 41/10* (2013.01); *F17C 2205/0329* (2013.01); *F17C 2205/0385* (2013.01); *F17C 2205/0394* (2013.01); *F17C 2260/036* (2013.01); *F17C 2270/0518* (2013.01)

(58) Field of Classification Search
CPC .. F16K 27/02; F16K 1/02; F16K 1/305; F16L 19/048; F17C 13/04
See application file for complete search history.

(56) References Cited

U.S. PATENT DOCUMENTS

| | | | |
|---|---|---|---|
| 2009/0165870 | A1 | 7/2009 | Konishi |
| 2015/0020899 | A1* | 1/2015 | Eyring ............... F17C 13/04 137/544 |

FOREIGN PATENT DOCUMENTS

| | | |
|---|---|---|
| CN | 105508626 A | 4/2016 |
| JP | 2003074798 A | 3/2003 |
| JP | 2009287753 A | 12/2009 |

OTHER PUBLICATIONS

PCT/US18/45213, Notification of Transmittal of the International Search Report and the Written Opinion of the International Searching Authority, or the Declaration, dated Oct. 12, 2018, 13 pages.

* cited by examiner

*Primary Examiner* — Eric Keasel
*Assistant Examiner* — Kevin R Barss
(74) *Attorney, Agent, or Firm* — Dergosits & Noah LLP

(57) ABSTRACT

A valve is disclosed with a clamp mechanism that accepts interchangeable outlet connections. The interchangeable outlook connections may have different sealing geometries, where different sealing geometries are specified to be used with different gases. For use with a particular gas, the valve may be configured with the interchangeable outlook connection with the sealing geometry that is appropriate for that gas.

6 Claims, 13 Drawing Sheets

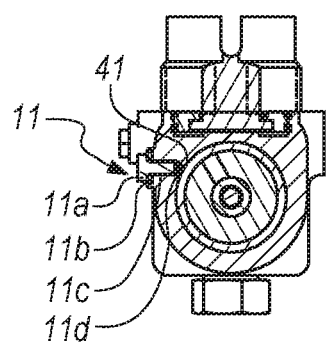
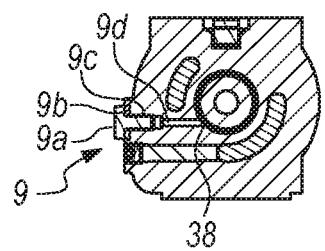
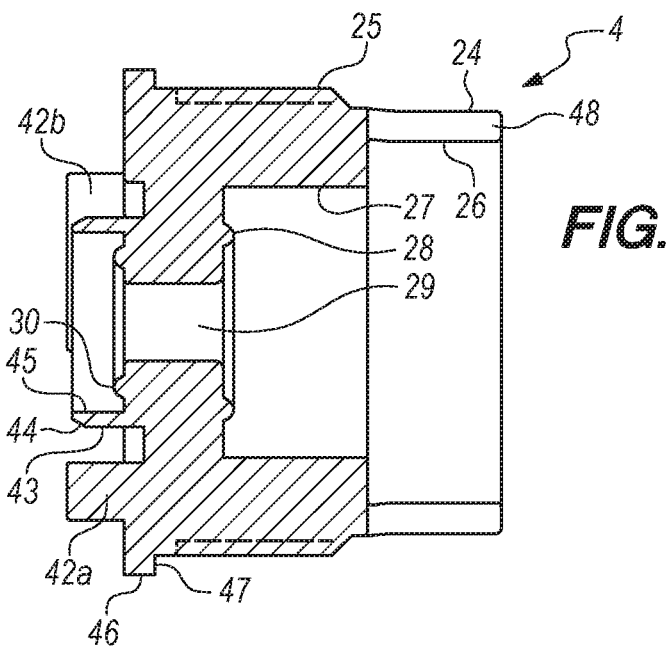
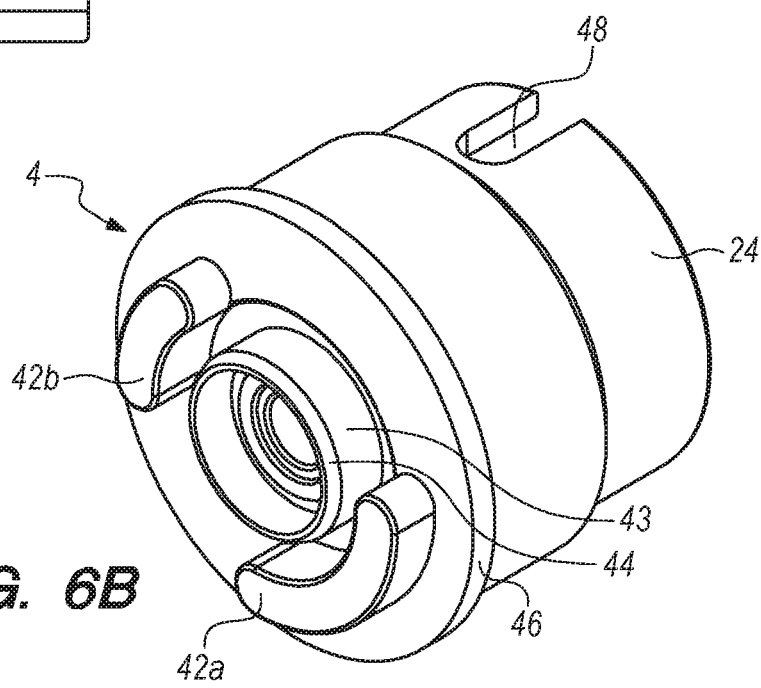

VALVE WITH INTERCHANGEABLE OUTLET CONNECTIONS FOR HIGH PURITY GASES

CROSS-REFERENCE TO RELATED CASES

The present application claims priority to U.S. Provisional Patent Application No. 62/540,812, entitled "INTERCHANGEABLE VALVE OUTLET CONNECTIONS FOR HIGH PURITY GASES," filed on Aug. 3, 2017, which is hereby incorporated by reference.

TECHNICAL FIELD

The present disclosure relates to the field of valves and, in particular, to valves with interchangeable outlet connections.

BACKGROUND

The 2013 version of Compressed Gas Association (CGA) Standard CGA V-1 specifies 115 cylinder-valve outlet connections for 270 compressed gases. The Standard specifies that all seals are metal to metal. In the Standard, the sealing geometry varies from connection to connection to ensure they can't accidentally be mismatched with an improper gas. Items such as thread size, thread pitch, thread direction, sealing form and angle, pilot bore and pilot length are changed.

FIG. 1 depicts an exemplary, prior-art, Standard cylinder-valve outlet connection: CVGA V-1 Connection 300 (0.825"-114 NGO-RH-EXT, a conical nipple style). In FIG. 1, line A represents a maximum radius of any part of valve with or without outlet cap=1.5 (38.1) with respect to the centerline of inlet thread on valve. FIG. 2 depicts another exemplary, prior art, Standard cylinder-valve outlet connection: CGA V-1 Connection 630 (1.030"-14 NGO-RH-EXT for ultra-high integrity service, a sealing-gasket style). In FIG. 2, line A represents a maximum radius of any part of valve with or without outlet cap=2.08 (52.3) with respect to the centerline of inlet thread on valve. As noted, there are 113 more outlet connections. For each of the 115 connections, CGA V-1 provides the geometry, surface finishes, materials and dimensional values/tolerances to ensure standard fits and proper performance.

The proliferation of connections prevents accidentally connecting inappropriate equipment to a compressed gas cylinder. However, it also makes valves non-interchangeable and unnecessarily expensive and unserviceable. This wastes natural resources and energy, and creates a stocking nightmare. That is, 115 valves are needed to support 270 gases. With some valve forms this stocking problem has forced the gas industry to experience lead times of 6-9 months and to make significant financial investments in inventory to mitigate these lead times and remain competitive.

In addition, in some gas applications, e.g., semiconductor gases where purity is extremely critical, any scratches or damage to the outlet area of the valve provides an area for impurities to be retained. As a result, damage to a valve outlet would cause the rejection of the cylinder and its contents, which would then require the gas supplier to incur significant costs to return the cylinder, remove and mitigate the gas contents, and, in most cases, dispose of both the valve and cylinder; the entire return process potentially costing thousands of dollars per cylinder.

For these reasons it would be desirable to have a common valve (or a small number of valves) and interchangeable outlet connections. This would greatly simplify the manufacturing and stocking of valves.

BRIEF DESCRIPTION OF THE DRAWINGS

The embodiments are illustrated by way of example and not limitation in the figures of the accompanying drawings, in which like references indicate similar elements, and in which:

FIG. 5D is a cross-sectional view depicting the section 5D-5D of FIG. 5A;

FIG. 5E is a cross-sectional view depicting the section 5E-5E of FIG. 5B;

FIG. 6A is a cross-sectional view depicting an interchangeable valve outlet connection according to an embodiment;

FIG. 6B is a perspective view depicting the interchangeable valve outlet connection of FIG. 6A;

DETAILED DESCRIPTION

The embodiments in this disclosure allow the gas industry the ability to purchase one valve type and stock a relatively low-cost inventory of outlets for that valve. This feature is anticipated to provide the industrial gas industry significant cost savings, reduced lead times in the delivery of valves, and increased flexibility for adapting changing market gas requirements. The embodiments of this disclosure also mitigate the expense incurred with returned cylinders by allowing only the damaged valve outlet to be replaced, which is a fraction of the cost of returning the cylinder, gas removal, and cylinder disposal. In specialty gas applications, the embodiments of this disclosure allow for the gas suppliers to thoroughly clean inside the upper valve cavity with the outlet port removed, a process that is difficult to perform with current valve designs due to the relatively small inlet port diameter.

The embodiments in this disclosure provide valves with interchangeable outlet connections. Thus, there would be a small number of valves (perhaps just 1) and 115 interchangeable outlet connections. The outlet connection need not be selected and installed until a specific valve order as to be fulfilled. Thus, the embodiments dramatically reduce the cost, complexity, mass of stocking valves for 270 gases. For reference, the outlet connection represents ~10% of the mass and cost of a CGA V-1 valve. So, stocking costs could be reduced by as much as 90%.

Though the disclosure initially focuses on interchangeable embodiments for CGA outlets, other standardized outlets in other countries or regions may also be fabricated to work with the invention. Other worldwide standards may include, but not be limited to, DIN 477 (Germany), BS 341 (United Kingdom), NF (France), GB 15383-2011 (China), KSB 6214 (Korea), JIS (Japan, Taiwan), TIS 88-2517 (Thailand), and IS 3224 (India). The ability of embodiments to allow the installation of a specific outlet connection in the country of use would allow the industrial gas industry to compete worldwide in markets other than where gas cylinders are filled. Thus, the embodiments provide a cost-effective alternative to the adoption of an international harmonization of gas outlets; thereby, eliminating the need to convert tens of millions of cylinders to a universal standard while respecting country specific outlet standards.

Figure 4:
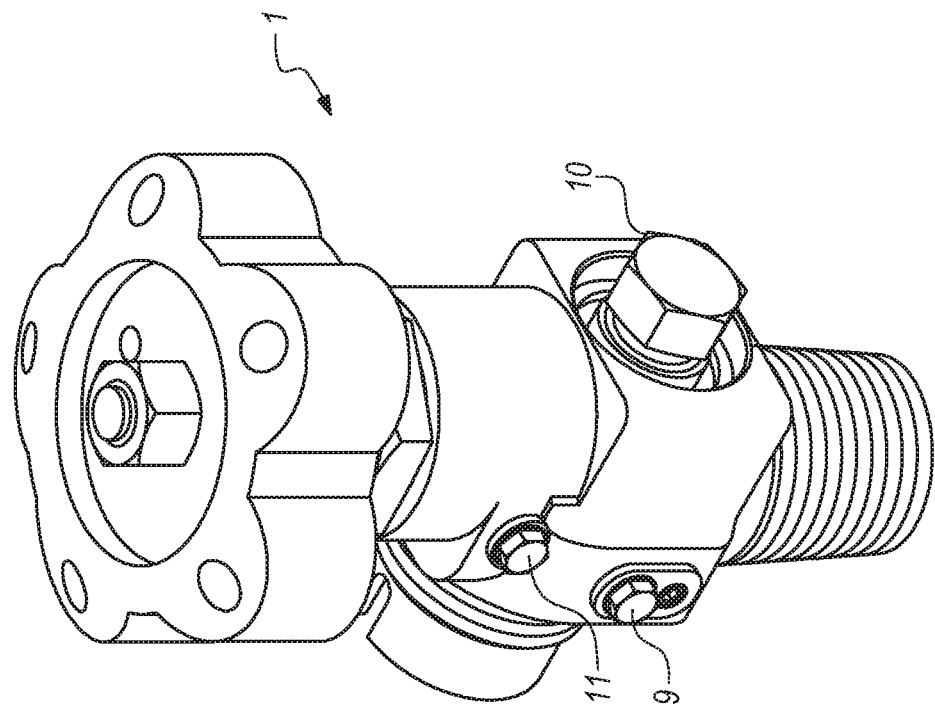
FIG. 4 is a perspective view depicting the valve of FIG. 3 rotated 180 degrees.
Figure 3:
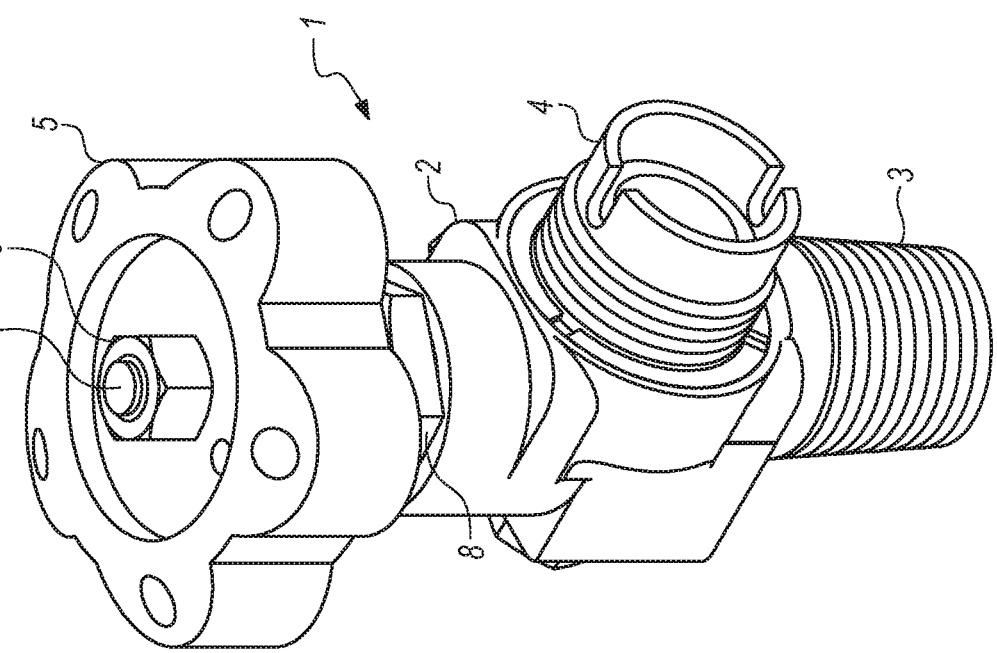
FIG. 3 is a perspective view depicting a CGA V-1 valve equipped with an interchangeable valve outlet connection according to an embodiment.

A typical CGA V-1 valve is made from either 316/316L stainless steel or Hastelloy®. FIG. 3 is a perspective view depicting a CGA V-1 valve 1 equipped with an interchangeable valve outlet connection 4 according to an embodiment. FIG. 4 is a perspective view depicting valve 1 of FIG. 3 rotated 180 degrees. Valve 1 comprises: a valve body 2 with an inlet stud 3 (and cylinder neck thread); an outlet connection 4; a hand wheel 5 (or other apparatus for opening and closing valve 1); a nut 6 clamping hand wheel 5 to a valve stem 7; a gland 8 that retains stem 7 in valve body 2; a threaded, sealed port 9 for checking for outlet leakage; a thermal/pressure safety device 10 (or a "fire safety" device); and a threaded, sealed port 11 for checking for valve leakage. Such valves are bidirectional, meaning that the cylinder is filled through the outlet connection 4 and, during usage, gas is withdrawn from the cylinder through outlet connection 4.

Figure 5A:
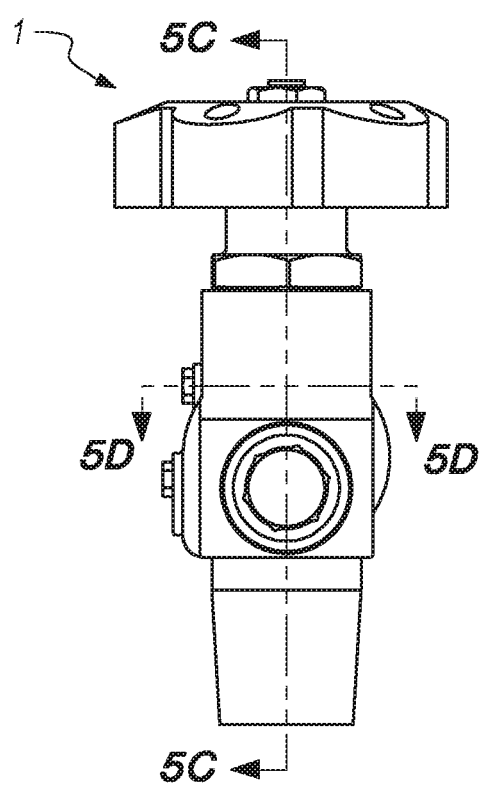
FIG. 5A is a rear view depicting the valve of FIG. 3.
Figure 5B:
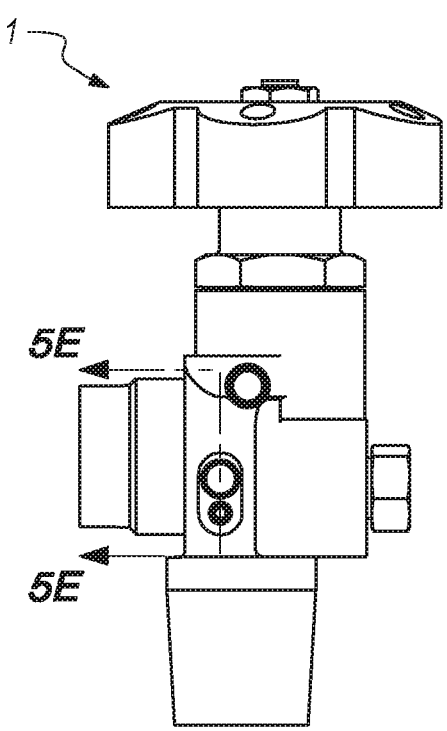
FIG. 5B is a right-side view depicting the valve of FIG. 3.
Figure 5C:
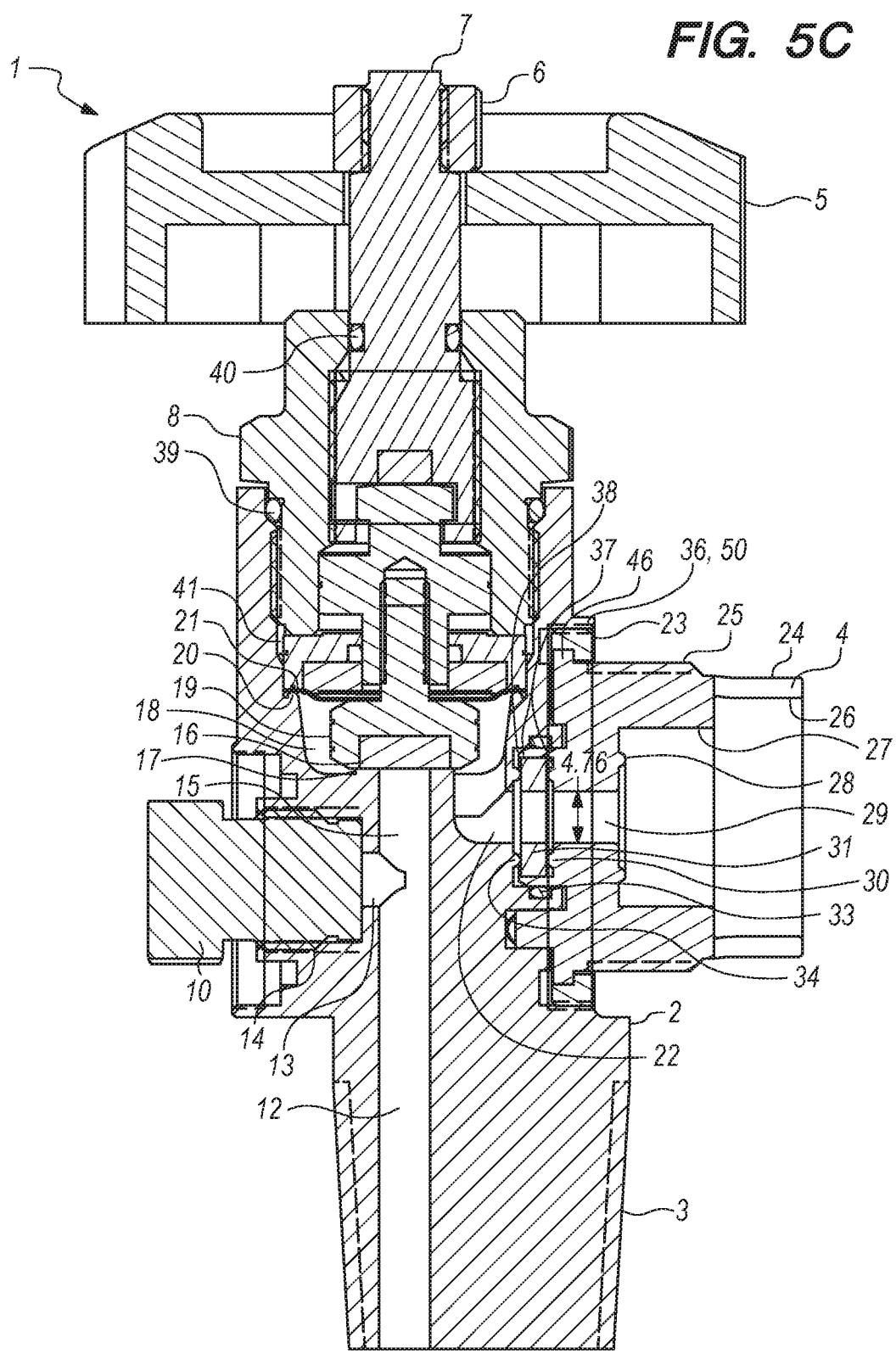
FIG. 5C is a cross-sectional view depicting the section 5C-5C of FIG. 5A.

FIG. 5A is a rear view depicting the valve of FIG. 3. FIG. 5B is a right-side view depicting the valve of FIG. 3. And FIG. 5C is a cross-sectional view depicting the section 5C-5C of FIG. 5A.

The following discussion describes flow in the withdrawal direction (i.e. from the cylinder to the outside world). In the filling mode, the flow directions are reversed. Valve 1 includes an inlet (stud) 3, which has a central bore 12 sized to both deliver the desired flow rate and to minimize propulsion forces in the event the valve head is sheared off at the cylinder neck. To fit the outlet connection and valve profile within the envelope specified by CGA V-1 the bore 12 may be offset (as shown) or drilled at angle off vertical. An intersecting passage 13 delivers cylinder pressure to a thermal and/or pressure relief device 10, which is held in place by appropriate threads 14. Various other apparatuses may be used to seal the safety 10 to the valve body 2, depending on the safety device used. Such apparatuses may include dry-seal pipe threads, metal gaskets, or cone-in-cone seals.

Central bore 12 intersects an annular valve cavity 18 via a bore sector 15. Bore sector 15 may offer an enlargement or a reduction in flow diameter depending on the valve design strategy selected. If a spindle 19 is open (e.g., retracted) gas exits bore 15 via a transition zone 17 and enters annular cavity 18. Gas in cavity 18 exits the bore through an intersecting passage 22, which connects to outlet connection 4.

Gas in cavity 18 is prevented from escaping to atmosphere via a thin metal diagram set 21 which is sealed via a metal to metal contact with the valve body 2 by an appropriate feature such as raised lip 20. Diaphragm set 21 may comprise a single part or as many as 4 diaphragms front-to-back, potentially of varying materials and thicknesses. Most typically, diaphragm set 21 is bonded and sealed to spindle 19 by a 360° weld. Stem 7 retracts and advances spindle 19 to open and close the valve. If the diaphragm set 21 seal should leak, external leakage past stem 7 is prevented by a seal 40 (an O-ring as shown) which seals the stem to a gland 8. While seal 40 is shown in the stem, it may just as effectively be in the gland 8 (i.e. a rod-type seal). Gland 8 is in turn sealed to valve body 2 by a seal 39 (an O-ring as shown). Seal 39 may also be in varying formats such piston-seal, rod seal, face seal, boss seal, etc.

Figure 1:
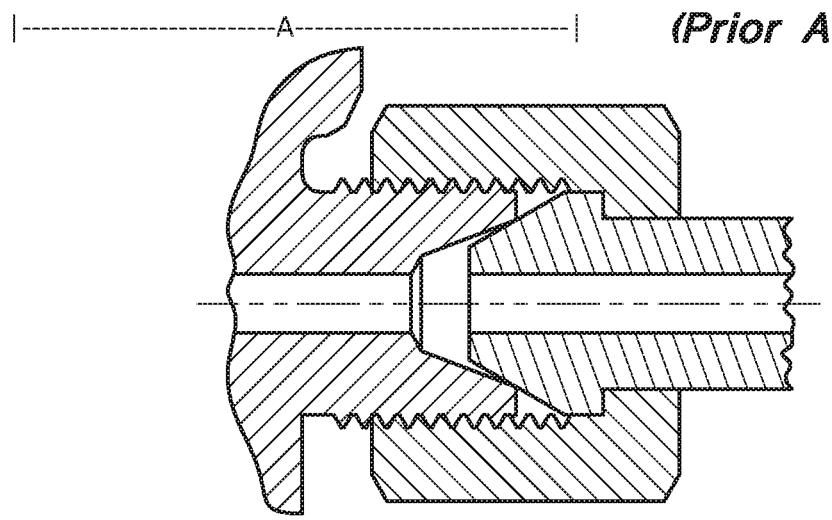
FIG. 1 depicts an exemplary, prior-art, Standard cylinder-valve outlet connection: CVGA V-1 Connection 300.
Figure 2:
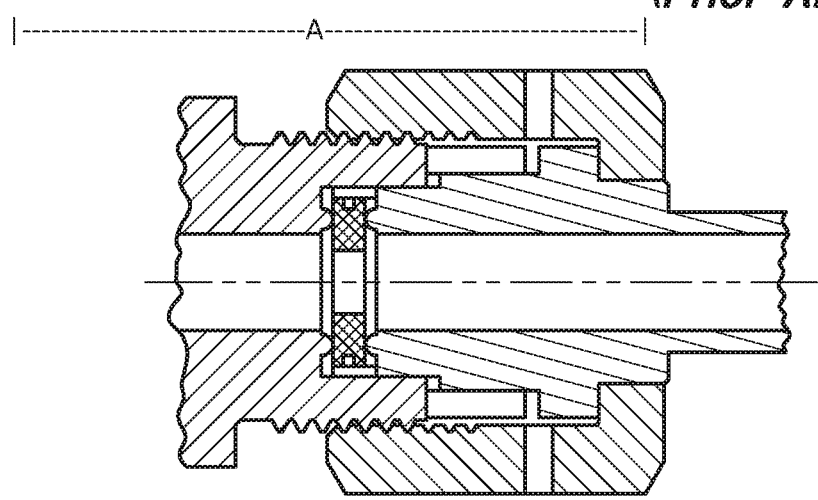
FIG. 2 depicts an exemplary, prior-art, Standard cylinder-valve outlet connection: CGA V-1 Connection 630.

In prior art valves, a passage (such as passage 22) connects directly to an outlet connection, with the entirety of the outlet connection being an integral part of the valve body (see, e.g., FIGS. 1 and 2). As shown in FIG. 5C, however, the outlet geometry is more complex, with outlet connection 4 configured according to CGA Connection No 712 and connected to valve body 2 according to an embodiment.

As shown in FIG. 5C, according to an embodiment of the invention, outlet connection 4 is a replaceable and interchangeable insert. Outlet connection 4 is retained to valve body 2 by a suitably threaded inverted-nut 23 (i.e. male threads 36 on nut 23's OD), which joins with mating female threads 50 in valve body 2. Each specific outlet connection would have the appropriate CGA V-1 specified geometry. As shown that would include OD 24 (and its length), pilot diameter 26 (and its length), seal diameter 27 (and its length), sealing feature 28 (diameter, OD, height, etc.), and outlet bore diameter 29. In many instances outlet bore 29 would also have a threaded and seating feature (not shown) for adding commercially available flow restrictors to bore 29.

FIG. 5D is a cross-sectional view depicting the section 5D-5D of FIG. 5A. In FIG. 5D, the low-pressure side of the spindle-stem assembly (19-7) is a pressure zone 41 which is nominally at atmospheric pressure. Zone 41 communicates with valve-leakage check-port 11 which is sealed by a suitable, removable apparatus. As shown in FIG. 5D that apparatus includes a screw 11a, a gasket 11b, a suitable thread 11c, and a connecting passage 11d communicating with sector 41. Port 11 may be used to check for leaks, or to plumb away any potential leakage gas (i.e., any leakage past the diaphragm), or both.

FIG. 5E is a cross-sectional view depicting the section 5E-5E of FIG. 5B. Outlet connection 4 may be sealed to valve body 2 by an annealed metal sealing gasket 31, which is most commonly pure nickel. In many cases, gasket 31 may be a commercially available, standard, CGA-specified gasket. Raised sealing lips 30, 34 on outlet connection 4 and valve body 2, respectively, create gas tight metal-to-metal seals against gasket 31.

In an embodiment, provisions are made for collecting gas in the rare instance of leakage around sealing gasket 31. In the embodiment, clearance between valve body 2 and outlet connection 4 creates an annular cavity 38, which delivers any leakage past sealing lips 34 to an outlet leak collection port 9. Similarly, any leakage past sealing lips 30 enter an annular gap 37 between sealing gasket 31 and outlet connection 4 flows into then flow into cavity 38 and thus be delivered to outlet leak port 9. Note that the call-out line for annular gap 37 splits to indicate two places of annular gap 37, one of which is difficult to see since, in the embodiment, the gap is approximately 0.1 mm. Any leakage gas in cavity 38 is prevented from leaking externally by a seal 33 (a rod-style O-ring as shown). As shown in FIG. 5E, port 9 includes a screw 9a, a gasket 9b, a suitable thread 9c, and a connecting passage 9d communicating with cavity 38. Port 9 may be used to check for leaks, or to plumb away any potential leakage gas (i.e., leakage past sealing gasket 31 of outlet connection 4), or both.

The scope of CGA V-1 covers a wide range of thread sizes, bore sizes, allowable valve widths (valve centerline to outer face of outlet connection) and expected or allowable torque values. Accordingly, in embodiments, the size and style of the sealing features (e.g., gasket 31, lips 30 and 34, and O-ring 33) and anti-rotation features (e.g., tangs 42a and 42b (FIG. 6A), slots 49a and 49b (FIG. 7A), dowel 55, and set screw 56) may be adjusted for the more extreme examples.

In an embodiment, one or both of oval tangs 42a and 42b, and the corresponding slots 49a, 49b may be replaced with a differently shaped protuberance and receptacle. For example, a protruding cylinder and a corresponding cylindrical hole. However, the shear strength of oval tangs 42a and 42b would be greater than comparably sized dowel pins. If even greater shear strength were desired the radial width of the tangs could be increased. Furthermore, the angular width of the tangs could also be increased to increase shear strength. In an embodiment, the number of oval tangs and corresponding receptacle pairs could be one, e.g., there could be one tang and one receptacle with the shape of the receptacle and tang determine whether an outlet connection will mate to a valve. In an embodiment, there may be three or more such tang/receptacle pairs that control whether an outlet connection will mate to a valve.

In an embodiment there may be no gasket between valve body 2 and outlet connection 4 with the seal about outlet bore 29 being made by direct contact between elements of valve body 2 and outlet connection 4, for example, direct contact between lip 30 and lip 34.

Figure 7A:
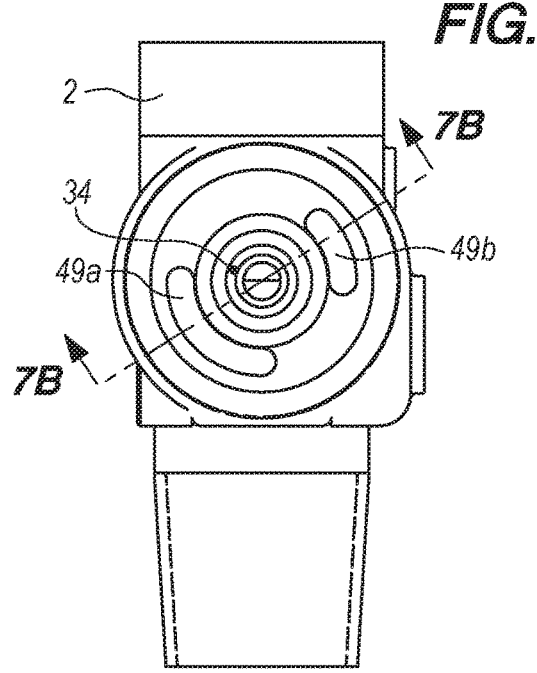
FIG. 7A is a front view depicting an exploded view of an interchangeable valve outlet connection according to an embodiment.
Figure 7B:
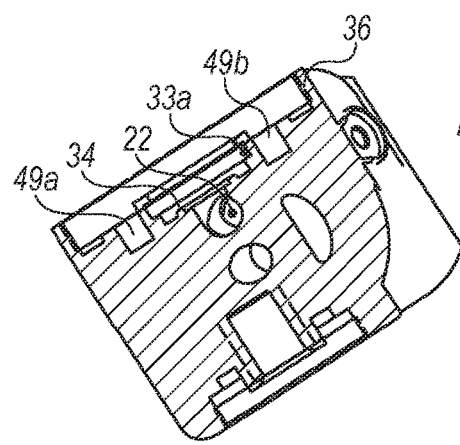
FIG. 7B is a cross-sectional view depicting the section 7B-7c of FIG. 7A.
Figure 8A:
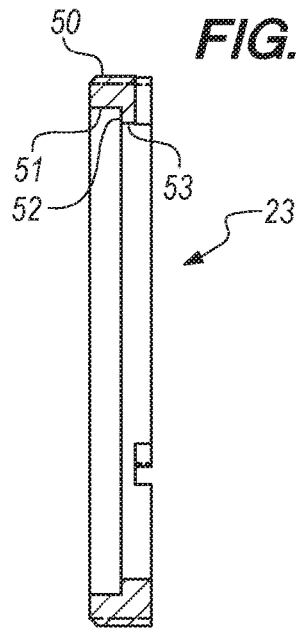
FIG. 8A is a perspective view of a threaded nut of an interchangeable valve outlet connection according to an embodiment.
Figure 8B:
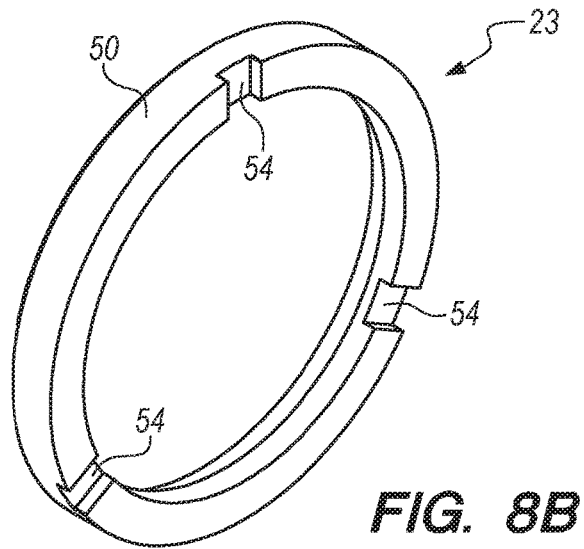
FIG. 8B is a cross-sectional view of the threaded nut of FIG. 8A.
Figure 9A:
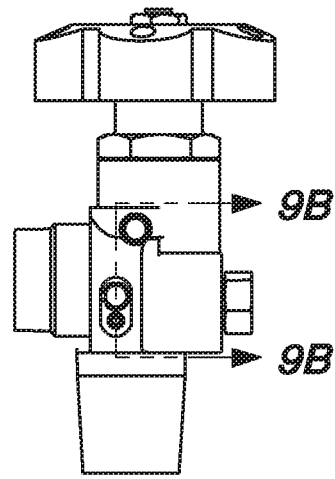
FIG. 9A is a right-side view depicting the valve of FIG. 3.
Figure 9B:
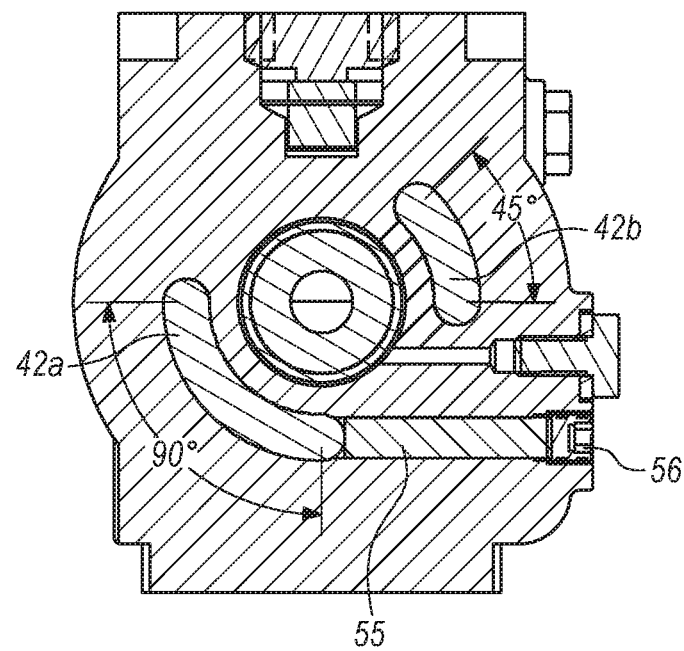
FIG. 9B is a cross-sectional view depicting the section 9B-9B of FIG. 9A.

FIG. 6A is a cross-sectional view depicting interchangeable valve outlet connection 4. FIG. 6B is a perspective view depicting interchangeable valve outlet connection 4. FIG. 7A is a front view depicting an interchangeable valve outlet connection with outlet connection 4 removed. FIG. 7B is a cross-sectional view depicting the section 7B-7c of FIG. 7A. FIG. 8A is a perspective view of a threaded nut for an interchangeable valve outlet connection according to an embodiment. FIG. 8B is a cross-sectional view of the threaded nut of FIG. 8A. FIG. 9A is a right-side view depicting the valve of FIG. 3. FIG. 9b is a cross-sectional view depicting the section 9b-9b of FIG. 9A. FIGS. 6A-9b illustrate an aspect of an embodiment, which is: to maximize the sealing efficiency of gasket 31 it is preferable that there is no relative angular rotation between outlet connection 4, gasket 31, and valve body 2. Such clockwise-counterclockwise dithering could occur during tightening and loosening of tubes or hoses attached to the outlet. Such dithering could degrade the metal-to-metal seal.

In FIGS. 6A and 6B, to limit relative rotation, outlet connection 4 has two oval tangs 42a, 42b that engage close tolerance oval slots 49a, 49b in valve body 2 (FIGS. 7A and 7B). The mating of oval tangs 42a, 42b and slots 49a, 49b creates a piloting effect, keeping outlet connection 4 centered in valve body 2. To mate, outlet connection 4 is inserted into valve body 2 and tightened and clamped in place by inverted nut 23 (FIG. 5C and FIG. 8A). As shown in FIG. 9b, a dowel pin 55 contacts one of the oval tangs, in this embodiment, tang 42a. A set screw 56 applies force to dowel pin 55, removing all clearances or lash and preventing the outlet connection from rotating (dithering) when attached hoses or tubes are tightened or loosened. That is, no annular rotation between gasket 31, valve body 2, and outlet connection 4 will occur during use. As shown in FIG. 9b, oval tangs 42a, 42b are 90° and 45° wide, respectively, about bore 29. Other angular widths may be chosen and the tangs could be of equal angular widths. It can be appreciated that the minimum angular width would be limited by the required shear strength of the smaller tang.

As shown in FIGS. 6A and 6B, outlet connection 4 has a lead-in chamfer 44 to engage and compress seal 33. Chamfer 44 is preferably ≤30°/side (as shown). A surface 43 of outlet connection 4 is specified as an ultra-fine finish surface, since it creates the minor diameter of the gland for seal 33. A bore 45 of outlet connection 4 is sized so as to allow an adequate flow path between it and the OD of gasket 31 because the resulting gap is annular gap 37 (FIG. 5C)), which provides a leakage flow path.

Outlet connection 4 has a shoulder 46, which is used to clamp output connection 4 into valve body 2. The width of shoulder 46 is sized to have the required shear strength and stiffness. A face 47 of shoulder 46 is clamped by a mating face 52 (FIG. 8A) in inverted nut 23. Thread 50 on nut 23 mates with thread 36 in valve body 2. Thread size, length, and torque are specified to create the necessary clamping force. The clamping force is absorbed by the raised lips 30, 34 and sealing gasket 31, creating a gas-tight seal. Bore 51 in nut 23 is a close fit to the OD of shoulder 46. Bore 53 is a close fit to outlet OD 25. However, both clearances are large enough for the fit of the oval tangs and slots to be in control and center outlet 4.

FIG. 8A is a perspective view of threaded nut 23 and FIG. 8B is a cross-sectional view of threaded nut 23 according to an embodiment. Threaded nut 23 clamps outlet connection 4 to valve body 2. To facilitate the application of fastening torque, threaded nut 23 is provided with 3 equally-spaced axial notches 54. Notches 54 are dimensioned to engage with a close-fitting splined wrench. Other mechanisms could also be used to apply fastening torque, such as holes in the outer face for a pin wrench, or a single notch for a toothed spanner wrench.

It may be appreciated that the design of threaded nut 23 has the uncommon goals of being very compact and of discouraging tampering. For compactness, the axial thickness must be minimized as CGA V-1 limits the maximum distance from the centerline of valve 2 to the outermost face of outlet 4. The need to discourage tampering is due to the potential seriousness of any high-pressure leaks. Some of the gases contained are extremely active and dangerous. Thus, only highly trained personnel should be able to access the nut. Using a nut that requires a custom tool discourages tampering.

Figure 10A:
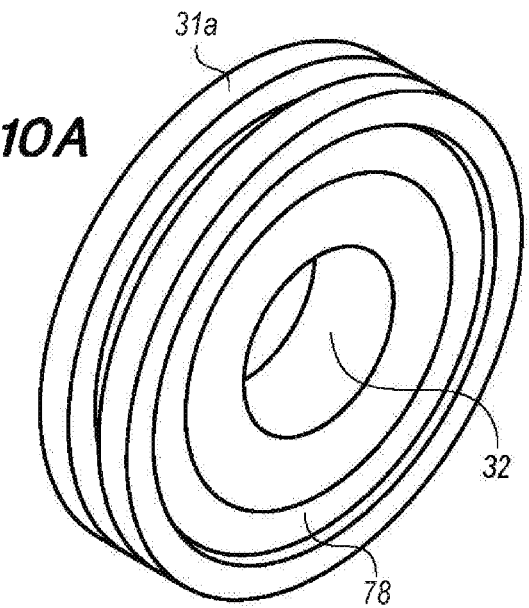
FIG. 10A is a perspective view depicting a gasket of an interchangeable valve outlet connection according to an embodiment.
Figure 10B:
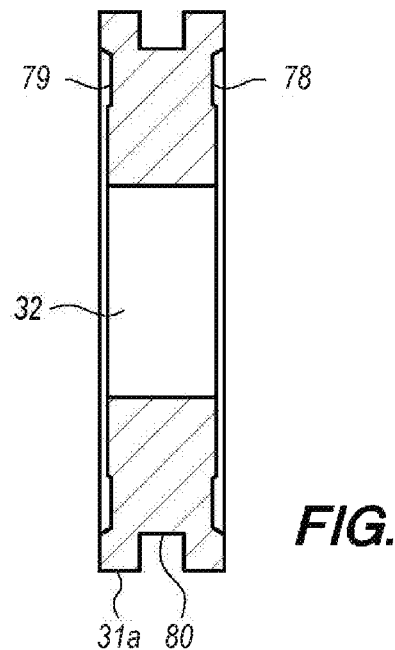
FIG. 10B is a cross-sectional view depicting the gasket of FIG. 10A.

FIG. 10A is a perspective view depicting an embodiment of gasket 31 of an interchangeable valve outlet connection according to an embodiment. FIG. 10B is a cross-sectional view depicting an embodiment of gasket 31 of FIG. 10A. In FIG. 5C, gasket 31 is a flat washer. In FIG. 10A and FIG. 10B gasket 31a is a flat washer with 2 shallow seating grooves 78, 79 sized to mate properly with sealing lips 30, 34. Gasket 31a may also have an external groove 80 for receiving a split ring, which can be helpful in removing the gasket for replacement. In an embodiment, a gasket may have an OD of 0.428" and an ID of 0.187" ID (and gasket 31a is a commercial part). Alternatively, other standard CGA V-1 gaskets could be used, including gaskets with or without annular sealing grooves on both sealing faces. In the embodiment, gasket 31a is 0.095" thick (axial width). However, other groove thicknesses could be used. The outlet's thru bore 32 is chosen to suit the valve's geometry and flow demands. In the embodiment of FIGS. 10A and 10B, the bore is 0.187" and is allowed by CGA V-1 (Connection No 712 specifies the bore ≤0.320"). The 0.187" size is appropriate for CGA V-1 Connections 712-728 as the specified gasket bore is 0.210"-0.215." That is, it is highly preferred for the gasket bore 32 to be reasonably close to but larger than valve bore 22 and outlet bore 29. That ensures that even with the worst case stack up of tolerances and fits the bores 22/29 are unobstructed. In contrast, CGA V-1 Connection No. 347, for example, has a specified valve bore of 0.100". A gasket for Connection No. 347 might instead have a suitably smaller through bore 32, to minimize gas velocity changes and turbulence that might contribute to flow losses, instabilities or potentially auto ignition of some gases.

Figure 11A:
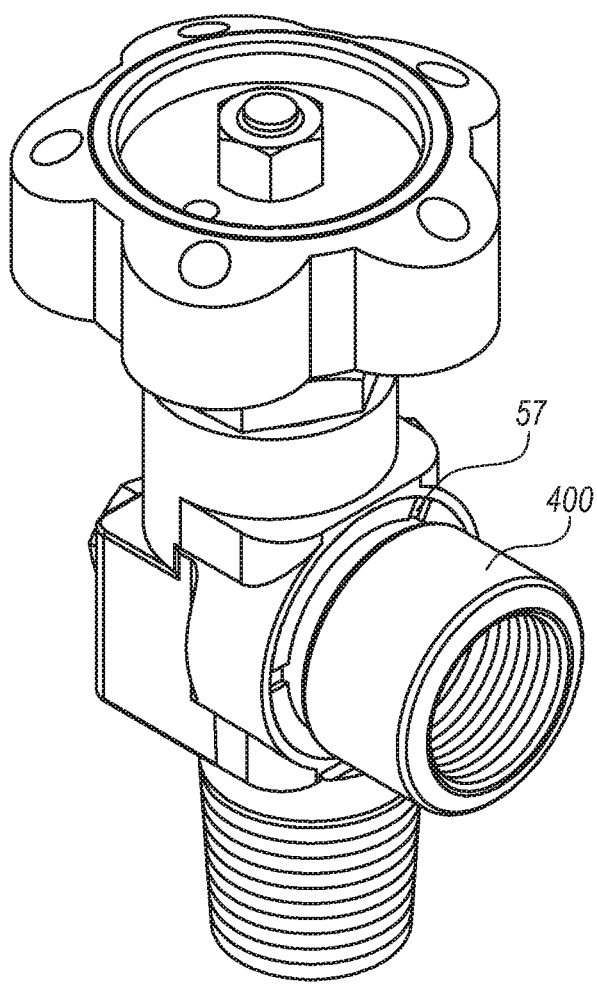
FIG. 11A is perspective view depicting an interchangeable valve outlet connection according to an embodiment.
Figure 11B:
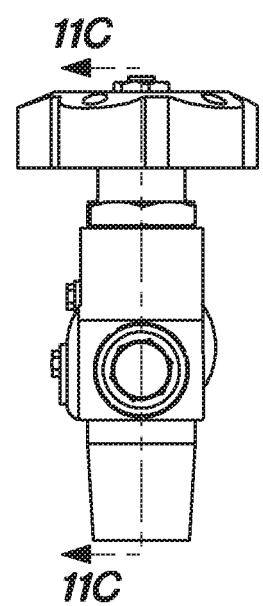
FIG. 11B is a rear view depicting the value of FIG. 11A.
Figure 11C:
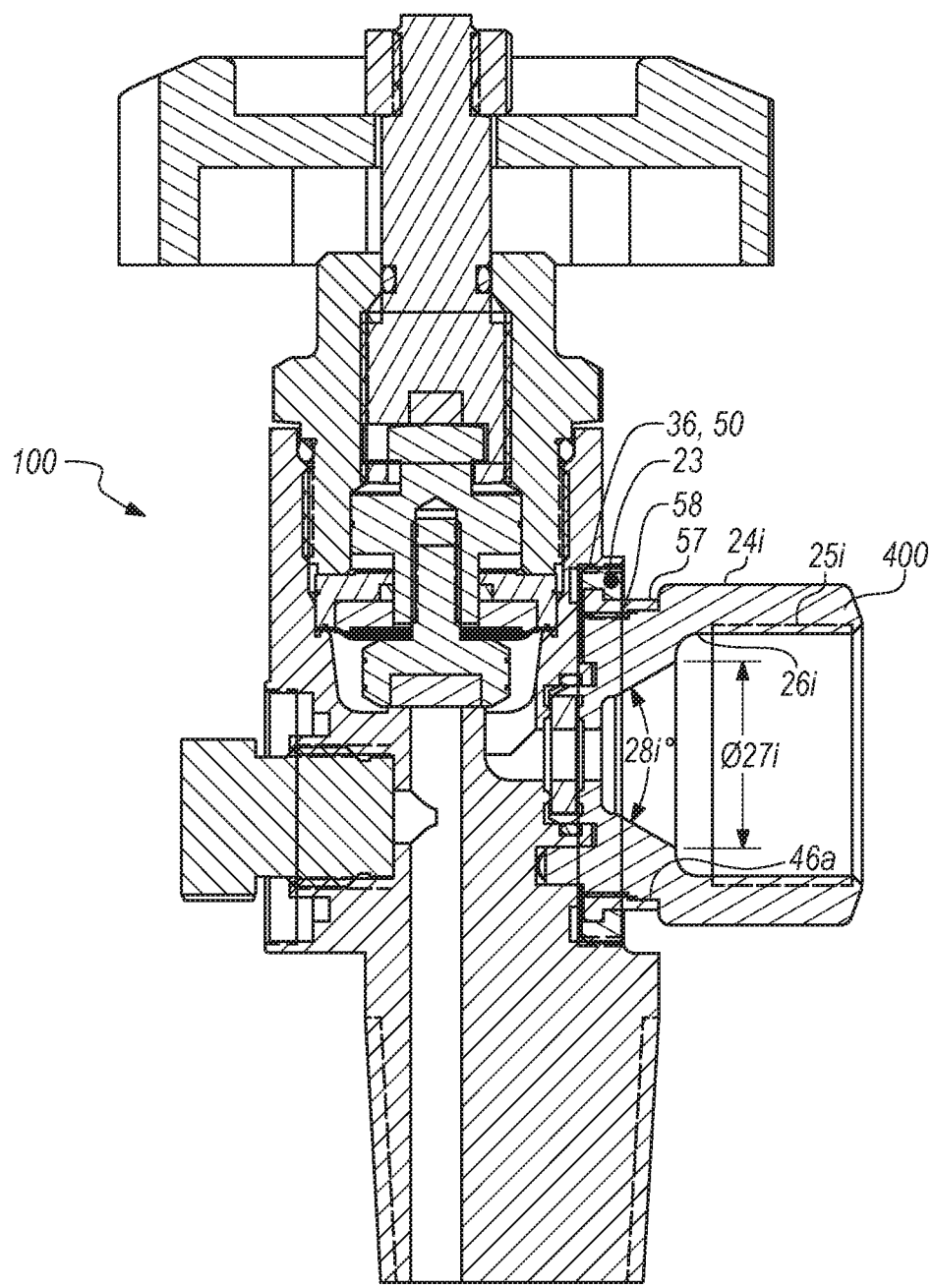
FIG. 11c is a cross-sectional view depicting section 11c-11c of FIG. 11B.

FIG. 11A is perspective view depicting an interchangeable valve outlet connection 100 according to an embodiment. FIG. 11B is a rear view depicting value 100 of FIG. 11A. And FIG. 11c is a cross-sectional view depicting section 11c-11c of FIG. 11B. Valve 100 has an appreciably larger CGA V-1 outlet connection 400, compared to outlet connection 4 of valve 1. Outlet 400 is a CGA V-1 Connection No. 580, which seals on a 60° cone. The OD of outlet connection 400 is much larger than bore 51 of inverted nut 23. Thus, a special accommodation is needed to clamp outlet connection 400 using inverted nut 23 and still keep the valve's perimeter within the CGA V-1 specified envelope.

Figure 12A:
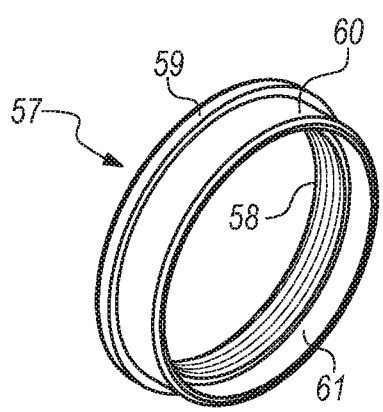
FIG. 12A is a perspective view depicting a threaded collar of an interchangeable valve outlet connection according to an embodiment.
Figure 12B:
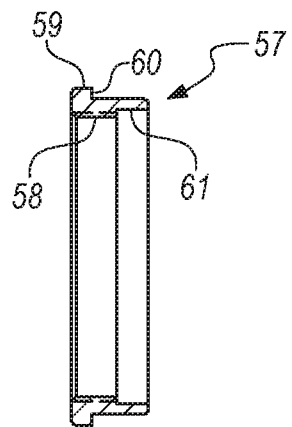
FIG. 12B is a cross-sectional view of the threaded collar of FIG. 12A.

In an embodiment, an accommodation to clamp outlet connection 400 takes the form of a threaded collar 57. FIG. 12A is a perspective view depicting a threaded collar 57 according to an embodiment, and FIG. 12B is a cross-sectional view of threaded collar 57 of FIG. 12A. FIG. 11c shows threaded collar 57 attached to connection outlet 400. Threaded collar 57 has a bore 61 which pilots on a mating outer diameter on outlet 400. Collar 57 also has a left-hand internal thread 58 which mates with a companion thread on the OD of outlet connection 400, joining outlet connection 400 and collar 57. Collar 57 has a shoulder 59 and a vertical face 60 which allow nut 23 to clamp the outlet/collar assembly in valve body 2. During assembly, inverted nut 23 is first placed over outlet connection 400. Collar 57 is then threaded onto outlet connection 400, capturing nut 23 between the collar and outlet connection 400. Inverted nut 23 may turn freely in this state. Left-hand threads 58 on collar 57 ensure that as inverted nut 23 is tightened collar 57 will either remain in place or be furthered tightened onto outlet 400. The outlet-connection features of outlet 400 are per CGA V-1. The clamping features of inverted nut 23 are as described above. The outlet-to-valve sealing features are common to embodiments and were discussed with respect to FIGS. 5A-10B.

It would be desirable if any vented gas from fire safety device 10 (e.g., FIGS. 4, 5B, and 5C), could be plumbed away and vented in a facility's prechosen location. Common practice is for safety devices 10 to vent directly into the area surrounding the gas cylinder. In an embodiment, indexable, interchangeable vent outlets may be attached that allow vented gas to be plumbed away.

Figure 13A:
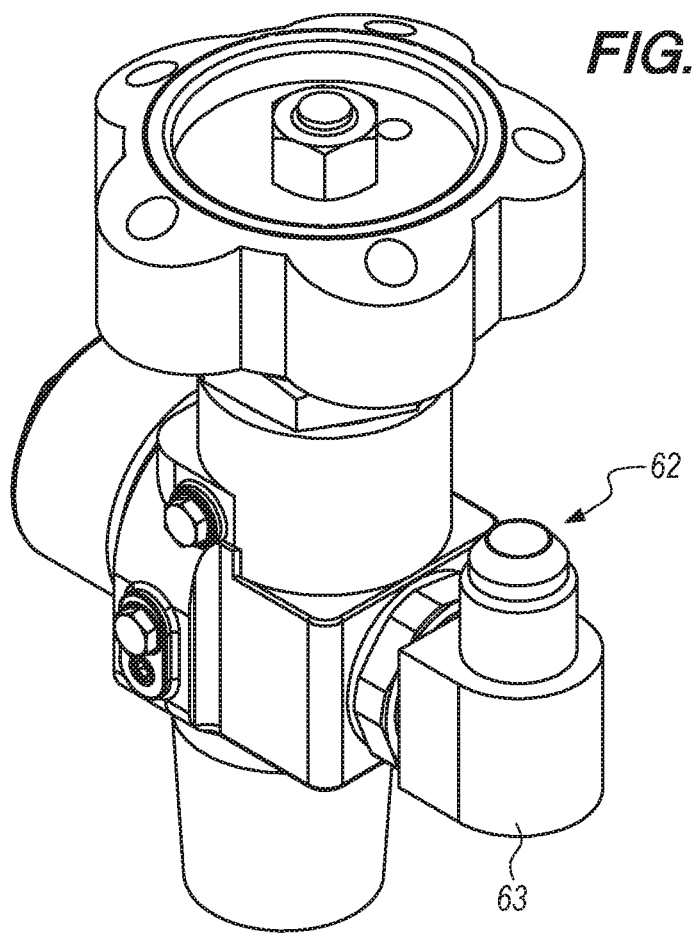
FIG. 13A is perspective view depicting a valve outlet connection according to an embodiment.
Figure 13B:
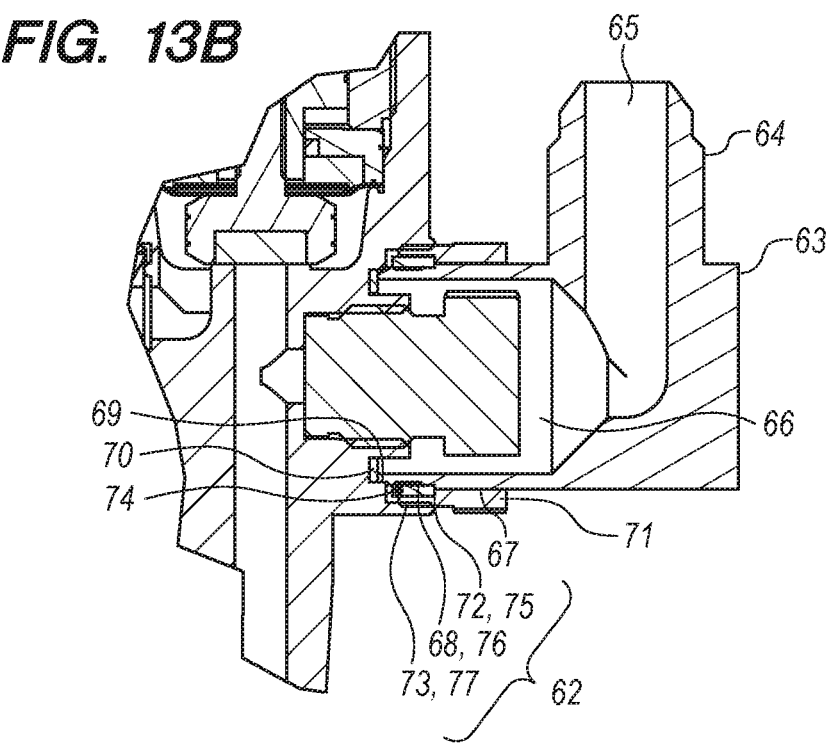
FIG. 13B is a cross-sectional view of the valve of FIG. 13A.
Figure 14:
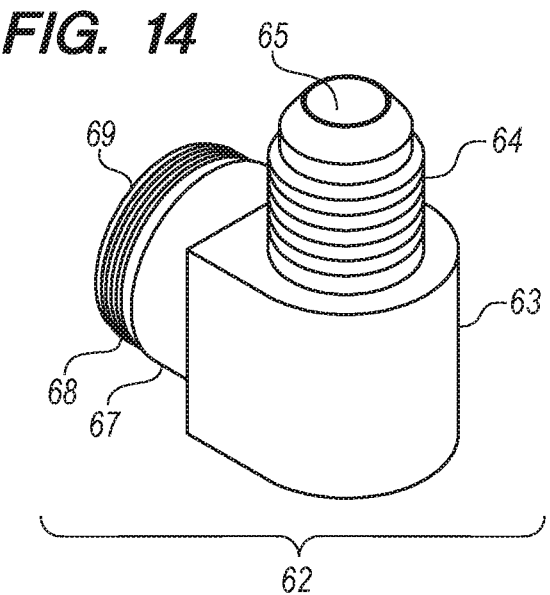
FIG. 14 is a perspective view of a vent connection of a valve outlet connection according to an embodiment.
Figure 15:
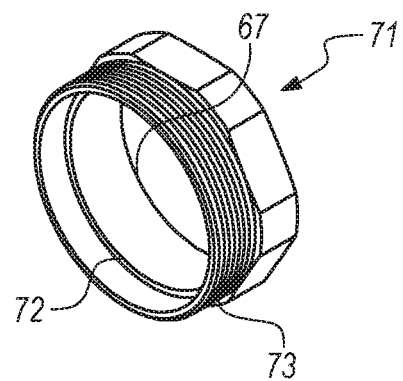
FIG. 15 is a perspective view of an inverted nut of a valve outlet connection according to an embodiment.
Figure 16:
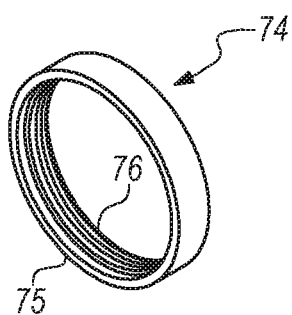
FIG. 16 is a perspective view of a collar of a valve outlet connection according to an embodiment.

FIG. 13A is perspective view depicting a vent fitting connection according to an embodiment. FIG. 13B is a cross-sectional view of the vent fitting connection of FIG. 13A. FIG. 14 is a perspective view of the vent fitting of FIGS. 13A and 13B. FIG. 15 is a perspective view of an inverted nut of a vent fitting connection according to an embodiment. FIG. 16 is a perspective view of a collar of a vent fitting connection according to an embodiment. As shown in FIGS. 13A and 13B, an indexable vent fitting 62 may be attached to a threaded cavity surrounding safety 10. Vent fitting 62 comprises a vent connection 63, an inverted nut 71, a threaded collar 74 and a gasket 70.

As shown, vent fitting 62 is a right angle (90°) connection. In other embodiments, vent fitting 62 may be of other formats including straight (0°), 45°, etc. Vent connection 63 has optional outlet forms 64. As shown outlet form 64 is a 37° flare form (SAE J514). Other formats are equally appropriate, including, for example, a 45° flare (SAE J512), a male pipe thread, a female pipe thread, an O-ring boss (SAE J1926), an O-ring face seal (SAE J1453), etc. An outlet bore 65 of vent fitting 62 should be chosen to properly handle the maximum vent flow. An inlet chamber 66 should be sized to handle vent flow from fire safety device 10. Most popular safeties 10 vent radially. So, chamber 66 is sized to turn the gas 90° without creating undue restriction (i.e., to keep a venting safety 10 sonic). A bore 67 of inverted nut 71 is chosen to be a close fit to the OD of vent fitting 62. An internal face 72 in inverted nut 71 mates with a shoulder 75 on collar 74 to transfer clamping load. A left-hand thread 68 on vent fitting 62 mates with a companion female thread 76 in collar 64, joining collar 64 and vent fitting 62. Left-hand thread 68 provides that as nut 71 is tightened, collar 34 will remain fixed or turn slightly in the tightening direction (i.e. further engaged). Male thread 77 on inverted nut 71 engages female thread 77 in the valve body, clamping connection 62 in the valve. Gasket 70 seals the connection so that all vented gas must pass thru outlet bore 65 (i.e., no external leakage occurs). Vent fitting 62 may be indexed to any desired angle about the axis of safety device 10 by loosening inverted nut 71, positioning outlet bore 65 as desired, and tightening inverted nut 71. The oval tangs shown in FIGS. 4a and 4b are much stronger than comparably sized dowel pins. If even greater shear strength were desired the radial width of the tangs could be increased. The angular width of the tangs could also be increased to increase shear strength.

In an embodiment, a valve assembly comprises: a valve body; a first outlet bore disposed in the valve body; a first sealing feature disposed on the valve body about the first outlet bore; and an outlet connection. In the embodiment, the outlet connection includes: a second outlet bore through the outlet connection, a second sealing feature about the second outlet bore, and a first sealing geometry. The embodiment further comprises: a first anti-rotation feature disposed on the valve body; a second anti-rotation feature disposed on the outlet connection; and a clamp mechanism. In the embodiment, the outlet connection is releasably positioned against the valve body and dimensioned such that a flow may pass between the first outlet bore and the second outlet bore and such that the first and second anti-rotation features engage, where the engaging operates to limit rotation of the outlet connection with respect to the first outlet bore, and such that activation of the clamp mechanism urges the first sealing feature toward the second sealing feature to create a seal between the first sealing feature and the second sealing feature. The embodiment may further comprise a gasket, where the first sealing feature includes a first raised lip provided about the first outlet bore and the second sealing feature includes a second raised lip provided about the second outlet bore, and where the gasket is disposed between the first sealing feature and the second sealing feature. In the embodiment, the first anti-rotation feature may include a slot provided in the valve body and the second anti-rotation feature may include a tang disposed on the outlet connection. In the embodiment, the clamp mechanism may include a threaded nut dimensioned to fit about the outlet connection and to engage with threads provided in the valve body about the first outlet bore. In the embodiment, the threaded nut may be an inverted nut dimensioned to engage a shoulder of the outlet connection.

In an embodiment, a valve assembly comprises: a valve body; a first outlet bore disposed in the valve body; a first sealing feature disposed on the valve body about the first outlet bore; a first anti-rotation feature disposed on the valve body; and a clamp mechanism. In this embodiment, the clamp mechanism is dimensioned and configured such that (even where the embodiment does not include an outlet connection): an outlet connection may be releasably positioned against the valve body such that a flow may pass between the first outlet bore and a second outlet bore through the outlet connection, and a second sealing feature of the outlet connection may be urged by activation of the clamp mechanism toward the first sealing feature of the outlet connection to create a seal between the first sealing feature and the second sealing feature; and the first anti-rotation feature disposed on the valve body is configured and positioned such that a second anti-rotation feature of the outlet connection may be engaged, the engaging operating to limit rotation of the outlet connection with respect to the first outlet bore. The embodiment may further comprise a gasket, where the first sealing feature includes a first raised lip provided about the first outlet bore, and wherein the clamp mechanism is configured such that: the outlet connection may be releasably positioned with the gasket disposed between the outlet connection and the valve body such that a flow may pass between the first outlet bore, the gasket, and the second outlet bore, and the second sealing feature includes a second raised lip provided about the second outlet bore and the second sealing feature may be urged by activation of the clamp mechanism toward the first sealing feature with the gasket disposed between the first and second sealing features. In the embodiment, the first anti-rotation feature may include a slot provided in the valve body, and the second anti-rotation feature may include a tang disposed on the outlet connection. In the embodiment, the clamp mechanism may include a threaded nut dimensioned to fit about the outlet connection and to engage with threads provided in the valve body about the first outlet bore. In the embodiment, the threaded nut may include an inverted nut dimensioned to engage a shoulder of the outlet connection. The embodiment may further comprise a plurality of outlet connections, each outlet connection of the plurality including: an outlet bore through the outlet connection, a sealing feature about the outlet bore, and a sealing geometry, where: the dimensions of the sealing feature are the same for each outlet connection of the plurality; the sealing geometry of each outlet connection of the plurality is different from the sealing geometries of the other outlet connections of the plurality. In the embodiment, each sealing geometry may correspond to a sealing geometry provided by Compressed Gas Association Standard CGA V-1.

In an embodiment, a removable outlet connection for a valve comprises: a first outlet bore through the outlet connection; a first sealing feature about the first outlet bore; a first anti-rotation feature; and a first sealing geometry. In this embodiment, the outlet connection is dimensioned and configured to interact with a valve body (even where the embodiment does not include a valve body) provided with a clamp mechanism, a second outlet bore, a second anti-rotation feature, and a second sealing feature such that: a flow may pass between the second outlet bore and the first outlet bore, the first sealing feature may be urged by use of the clamp mechanism toward the second sealing feature to create a seal between the first and second sealing features, and the first anti-rotation feature is dimensioned to engage with the second anti-rotation feature, the engaging operating to limit rotation of the outlet connection with respect to the second outlet bore. In the embodiment, the first sealing feature may include a first raised lip provided about the first outlet bore, the second sealing feature may include a second raised lip provided about the second outlet bore, the valve body may be provided with a gasket, and the outlet connection may be dimensioned and configured to interact with the clamp mechanism such that with the gasket disposed between the first sealing feature and the second sealing feature, application of the clamp mechanism urges the first sealing feature toward the second sealing feature to create a seal on the gasket between the first and second sealing features. In the embodiment, the first anti-rotation feature may include a tang disposed on the outlet connection and the second anti-rotation feature may include a slot provided in the valve body. In the embodiment, the clamp mechanism may include a threaded nut dimensioned to fit about the outlet connection and to engage with threads provided in the valve body about the second outlet bore.

In an embodiment, a valve assembly comprises: a valve body; a first outlet bore disposed in the valve body; an outlet connection (including: a second outlet bore through the outlet connection, and a first sealing geometry); means for creating a seal about the first outlet bore, and between the valve body and the outlet connection; means for limiting rotation of the outlet connection with respect to the first outlet bore; and means for clamping the outlet connection to the valve body, where, in the embodiment, the means for clamping releasably position the outlet connection against the valve body and provide a force used by the means for sealing, the means for sealing are dimensioned to provide for a flow to pass between the first outlet bore and the second outlet bore and to use the force provided by the means for clamping to prevent leaking, and the means for limiting rotation limit rotation of the outlet connection with respect to the first outlet bore. In the embodiment, the means for creating a seal may comprise: a first sealing feature disposed on the valve body about the first outlet bore; a second sealing feature about the second outlet bore; and a gasket, where the first sealing feature may include a first raised lip provided about the first outlet bore and the second sealing feature may include a second raised lip provided about the second outlet bore, and where the gasket may be disposed between the first sealing feature and the second sealing feature. In the embodiment, the means for clamping may comprise a threaded nut dimensioned to fit about the outlet connection and to engage with threads provided in the valve body about the first outlet bore. In the embodiment, the clamp mechanism may include a threaded nut dimensioned to fit about the outlet connection and to engage with threads provided in the valve body about the first outlet bore.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter as permitted by applicable law. Moreover, any combination of the above-described elements in all possible variations thereof is encompassed unless otherwise indicated herein or otherwise clearly contradicted by context.

What is claimed is:

1. A valve assembly comprising:
   a valve body;
   a first outlet bore disposed in the valve body;
   a first sealing feature disposed on the valve body about the first outlet bore;
   a first anti-rotation feature disposed on the valve body; and
   a clamp mechanism; and
   an outlet connection from a plurality of outlet connections, each outlet connection of the plurality including:
      a second outlet bore through the outlet connection, and
      a second sealing feature about the second outlet bore
      a sealing geometry,
   wherein:
      the dimensions of the second sealing feature are the same for each outlet connection of the plurality,
      each outlet connection from the plurality of outlet connections includes a sealing geometry that is different from the sealing geometries of the other outlet connections of the plurality,
      the clamp mechanism is dimensioned and configured such that:
         each outlet connection from the plurality of outlet connections may be releasably positioned against the valve body such that a flow may pass between the first outlet bore and the second outlet bore through the outlet connection, and
         the second sealing feature of the outlet connection may be urged by activation of the clamp mechanism toward the first sealing feature of the valve body to create a seal between the first sealing feature and the second sealing feature; and
      the first anti-rotation feature disposed on the valve body is configured and positioned such that a second anti-rotation feature of the outlet connection may be engaged, the engaging operating to limit rotation of the outlet connection with respect to the first outlet bore.

2. The valve assembly of claim 1 further comprising a gasket, wherein the first sealing feature includes a first raised lip provided about the first outlet bore, and wherein the clamp mechanism is configured such that:
   the outlet connection may be releasably positioned with the gasket disposed between the outlet connection and the valve body such that a flow may pass between the first outlet bore, the gasket, and the second outlet bore, and
   the second sealing feature includes a second raised lip provided about the second outlet bore and the second sealing feature may be urged by activation of the clamp mechanism toward the first sealing feature with the gasket disposed between the first and second sealing features.

3. The valve assembly of claim 1, wherein the first anti-rotation feature includes a slot provided in the valve body, and the second anti-rotation feature includes a tang disposed on the outlet connection.

4. The valve assembly of claim 1, wherein the clamp mechanism includes a threaded nut dimensioned to fit about the outlet connection and to engage with threads provided in the valve body about the first outlet bore.

5. The valve assembly of claim 4, wherein the threaded nut is an inverted nut dimensioned to engage a shoulder of the outlet connection.

6. The valve assembly of claim 1, wherein each sealing geometry corresponds to a sealing geometry provided by Compressed Gas Association Standard CGA V-1.

* * * * *